United States Patent [19]
Imazeki et al.

[11] Patent Number: 5,847,782
[45] Date of Patent: Dec. 8, 1998

[54] METHOD FOR PACKAGING A LIQUID CRYSTAL PANEL AND A LIQUID CRYSTAL PANEL PACKAGE

[75] Inventors: Yoshikatsu Imazeki, Suhwa; Shoji Hinata, Suwa, both of Japan

[73] Assignee: Seiko Epson Corporation, Tokyo, Japan

[21] Appl. No.: 944,870

[22] Filed: Oct. 6, 1997

[30] Foreign Application Priority Data

Oct. 4, 1996 [JP] Japan .................................. 8-264948
Feb. 27, 1997 [JP] Japan .................................. 9-044387

[51] Int. Cl.⁶ .................................................. G02F 1/1333
[52] U.S. Cl. .............................. 349/58; 349/158; 349/56; 349/187
[58] Field of Search .............................. 349/58, 158, 56, 349/187

[56] References Cited

U.S. PATENT DOCUMENTS 3,866,313 2/1975 Yih ............................................ 29/592
4,597,635 7/1986 Hoshikawa ............................ 350/334
5,313,322 5/1994 Takanashi et al. ..................... 359/82
5,637,359 6/1997 Fukuchi et al. ......................... 428/1

FOREIGN PATENT DOCUMENTS 1-153472 6/1989 Japan .

Primary Examiner—William L. Sikes
Assistant Examiner—Robert J. Hollingshead
Attorney, Agent, or Firm—Oliff & Berridge, PLC

[57] ABSTRACT

A method is described for packaging a liquid crystal panel device that includes a pair of plastic substrates and a liquid crystal material encapsulated therebetween. The method includes the steps of enveloping the liquid crystal panel device by a container substantially impermeable to gases and containing an undesirable gas, removing the undesirable gas from the container and hermetically sealing the liquid crystal panel device in the container after removing the undesirable gas therefrom. A liquid crystal panel package is also described which includes at least one liquid crystal panel device, a packaging box and a container. The packaging box is sized to receive the liquid crystal panel device and is fabricated from a gas permeable material. The container is fabricated from a gas impermeable material and contains an undesirable gas. The container is sized to contain the packaging box with the liquid crystal panel device received therein. After the undesirable gas is removed from the container, the container contains the packaging box and the liquid crystal panel device substantially free of the undesirable gas in a hermetically sealed state.

16 Claims, 4 Drawing Sheets

METHOD FOR PACKAGING A LIQUID CRYSTAL PANEL AND A LIQUID CRYSTAL PANEL PACKAGE

BACKGROUND OF THE INVENTION

1. Field of the Invention

The present invention relates to a method for packaging a liquid crystal panel or a liquid crystal display and a package containing either the liquid crystal panel or the liquid crystal display. In particular, the present invention relates to a packaging method concerning a liquid crystal panel device in which a liquid crystal material is encapsulated between a pair of plastic substrates.

2. Description of the Related Art

Liquid crystal displays are widely used in a variety of equipment such as mobile cellular telephones, navigation systems and computers for displaying character and/or image information. Such liquid crystal displays generally comprise a liquid crystal driving IC connected to a liquid crystal panel having auxiliary components such as a back light and/or a casing. The liquid crystal panel is ordinarily fabricated by filling a space between two (2) transparent substrates with a liquid crystal material, and is sometimes equipped with a polarizing plate, a color filter and other components.

Typically, the liquid crystal panel is stored and/or transported as a liquid crystal display only or as a liquid crystal display with auxiliary components. Additionally, these liquid crystal displays are first packaged before storage or transportation. Typically, liquid crystal displays are packaged by merely enclosing them in packaging boxes such as corrugated fiberboard or cardboard boxes.

Liquid crystal panels having transparent glass substrates or transparent plastic substrates to encapsulate the liquid crystal material are known. Although liquid crystal panels which use transparent plastic substrates have many advantages such as crack resistance, thin, light weight and formable into various shapes, they have one particular disadvantage in that gases such as $O_2$ and $CO_2$, i.e., gases contained in air, readily enter the liquid crystal panel through pores in the plastic substrates and accumulate in the liquid crystal material.

When gas enters the liquid crystal material through the liquid crystal panel, for example, as shown in FIG. 7, bubbles 52 can form inside a liquid crystal panel 51. Bubbles can form by subjecting the liquid crystal panel 51 to an impact force or a pressing force by pressing the surface of the panel, for example, by a person's finger. As a result, the liquid crystal panel is rendered useless. To help alleviate this problem, a gas barrier layer for preventing gas permeation is laminated onto the plastic substrate in order to prevent entrance of such gases. Even with gas barriers, however, it has been difficult to prevent gas from entering into the liquid crystal material during storage or transportation of the liquid crystal panel.

The present invention has been developed in consideration of the above-described problems of conventional packaging methods.

OBJECT AND SUMMARY OF THE INVENTION

An object of the present invention is to prevent bubble generation in liquid crystal panels and displays by inhibiting entrance of undesirable gases into the liquid crystal material in liquid crystal panels and displays that use plastic substrates.

In order to achieve the above-described object, the method for packaging a liquid crystal panel according to the present invention concerns a method for packaging a liquid crystal panel having a pair of plastic substrates and a liquid crystal material encapsulated between the plastic substrates. The method of the present invention includes the steps of hermetically surrounding the liquid crystal panel to form a hermetically sealed space, and removing undesirable gases, such as $O_2$ and $CO_2$, from the hermetically sealed space. By removing these undesirable gases from the hermetically sealed space surrounding a liquid crystal panel, such gases are reliably prevented from entering the liquid crystal material through the plastic substrates. As a result, bubble generation in the liquid crystal material can be prevented.

The liquid crystal panel may be packaged individually or may be packaged in the form of a liquid crystal display having the liquid crystal panel with auxiliary components such as a back light and other components. In any case, the liquid crystal material is hermetically surrounded in a container such as a bag fabricated from a gas impermeable material. Additionally, the liquid crystal panel may be individually hermetically surrounded or a plurality of liquid crystal panels may be enclosed in one packaging box, and the box is then hermetically surrounded by the container.

The method for removing undesirable gases such as $O_2$ and $CO_2$ from the hermetically sealed space surrounding a liquid crystal panel is not limited. For example, air contained in the hermetically sealed space may be replaced with a desirable gas or such a hermetically sealed space may be subjected to a vacuum condition or a depressurized condition. For purposes of the present invention, "a vacuum condition" means a condition in which the pressure is zero, and "a depressurized condition" means a condition in which the pressure is lower than ambient pressure. When a gas-replacing method is employed, the desirable gas to be used should preferably have properties such as a molecular diameter sufficiently large relative to the gas-permeating pores of the plastic material constituting the plastic substrates. In addition, a small solubility coefficient is also preferred. Examples of such gases include nitrogen ($N_2$), xenon (Xe) and krypton (Kr).

DETAILED DESCRIPTION OF THE PREFERRED EMBODIMENTS

Figure 1:
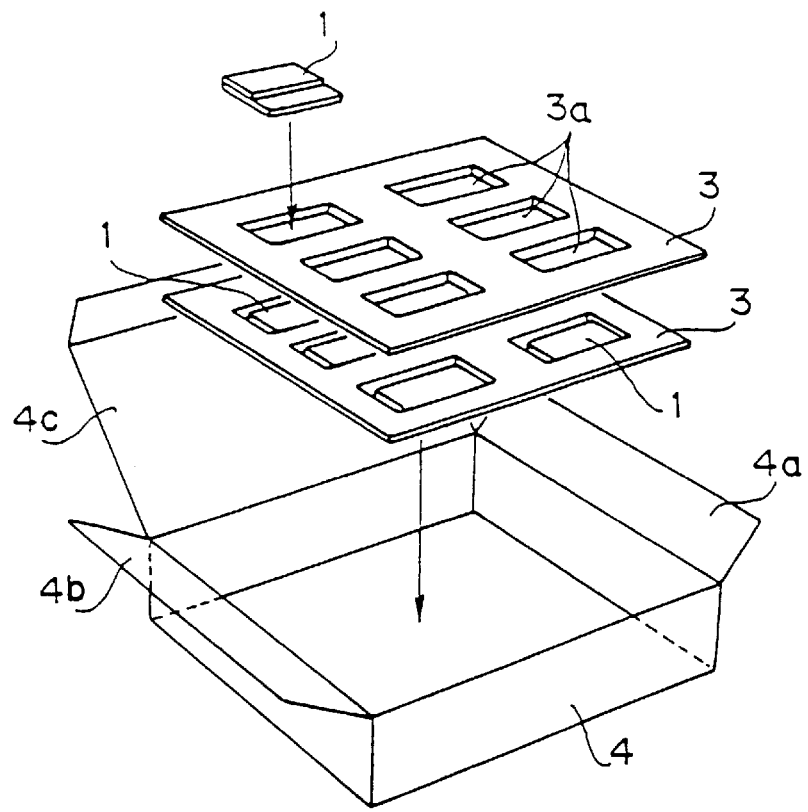
FIG. 1 is a perspective view showing a step in a method for packaging liquid crystal panels according to the present invention.
Figure 2:
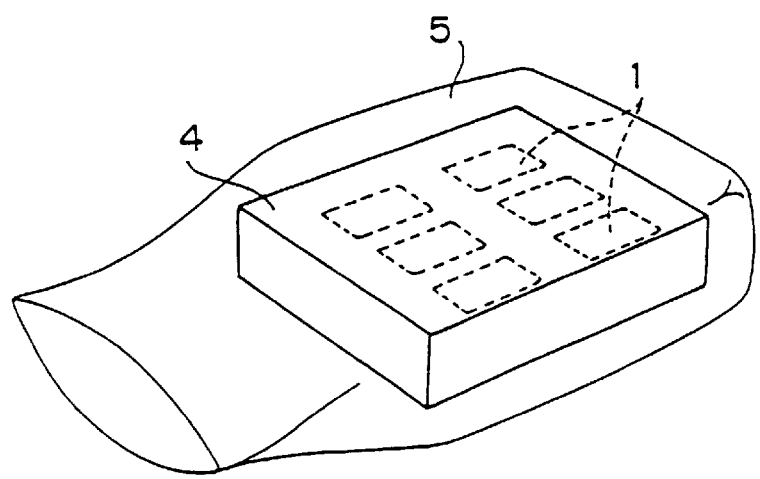
FIG. 2 is a perspective view showing another step in the method for packing liquid crystal panels according to the present invention.
Figure 3:
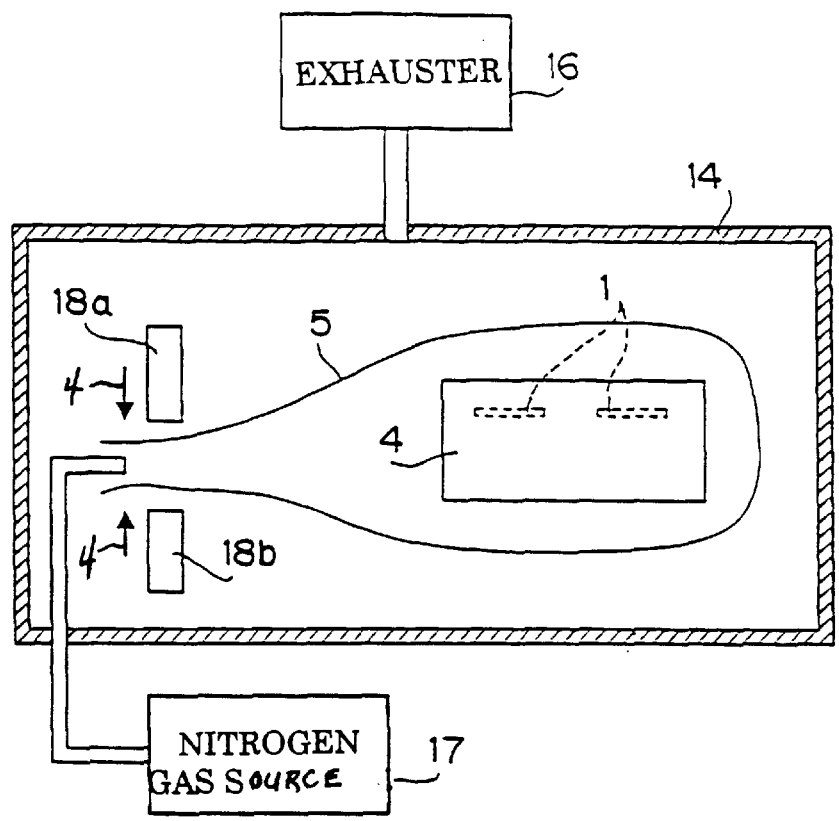
FIG. 3 is a perspective view showing another step in the method for packing liquid crystal panels according to the present invention.

FIGS. 1 to 3 show the steps of a method for packaging liquid crystal panels according to the present invention.

Figure 4:
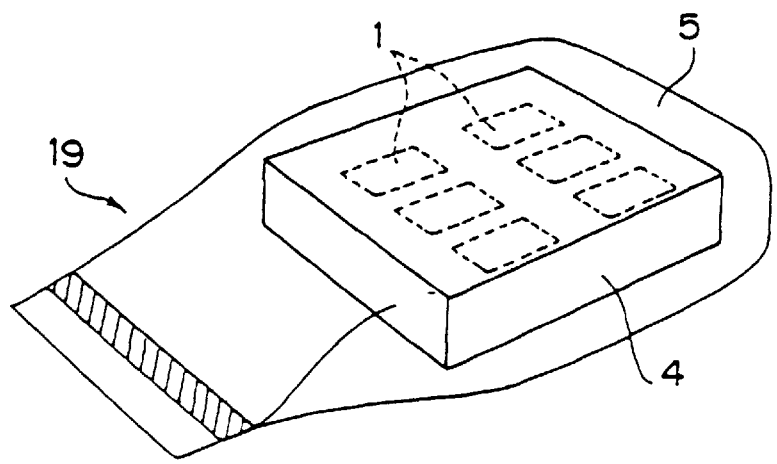
FIG. 4 is a perspective view showing an embodiment of the liquid crystal panel package according to the present invention.

Additionally, FIG. 4 shows an example of a liquid crystal panel package resulting from the steps of the method according to the present invention. In FIG. 1, a plurality of liquid crystal panels 1 are placed in respective ones of a plurality of cavities 3a formed on a pallet 3. A plurality of pallets 3 holding crystal panels 1 are then stacked and enclosed in a packaging box 4. The box is then closed using flaps 4a, 4b and 4c. In FIG. 1, although two pallets 3 are illustrated, the number of pallets that can be enclosed is not limited to two. A pallet 3 may be made of, for example, PVC (polyvinyl chloride). Meanwhile, the packaging box 4 may be made of, for example, a corrugated fiberboard or cardboard.

Figure 5:
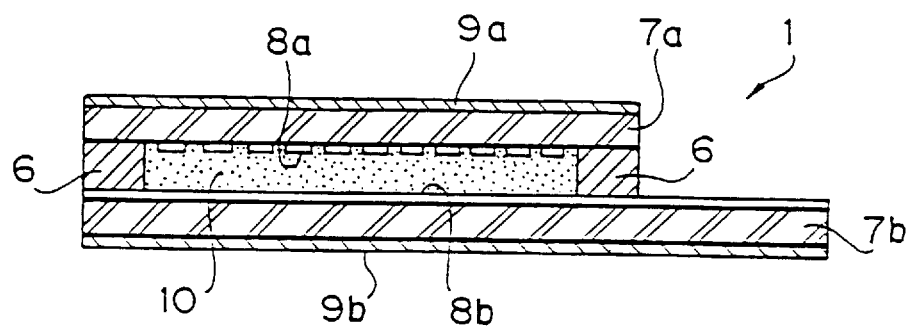
FIG. 5 is a cross-sectional view showing an example of a liquid crystal panel.

As shown in FIG. 5, the liquid crystal panel 1 may, for example, have a pair of transparent plastic substrates 7a and 7b bonded together by sealing members 6. On an inner surface of the transparent substrate 7a, transparent electrodes 8a are formed using, for example, indium tin oxide, which is commonly referred to as "ITO". A transparent electrode 8b, similarly made of ITO, is formed on an inner surface of the opposing transparent substrate 7b. Further, polarizing plates 9a and 9b are laminated to the substrates 7a and 7b, respectively, with an adhesive or the like. A liquid crystal material 10 is encapsulated in a space, which is sometimes referred to as "the cell gap" formed between the substrates 7a and 7b.

Figure 6:
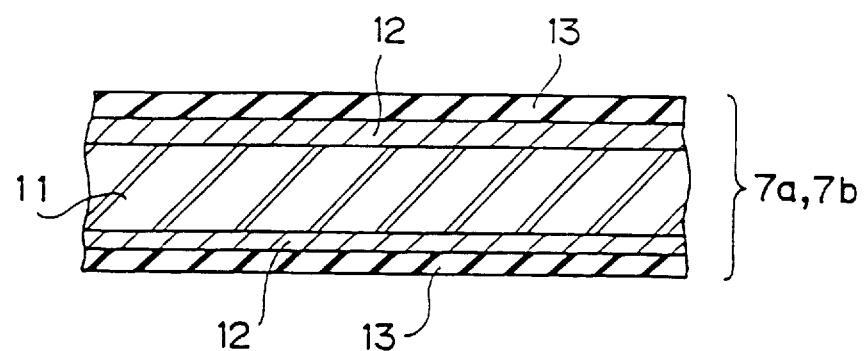
FIG. 6 is a cross-sectional view showing an internal structure of an example of a plastic substrate as a component of a liquid crystal panel.
Figure 7:
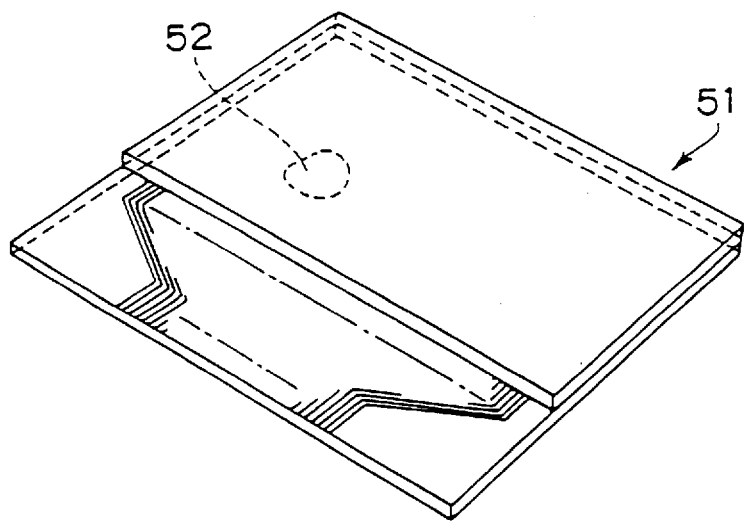
FIG. 7 is a perspective view showing a state in which a bubble is formed in a liquid crystal material encapsulated in a liquid crystal panel.

As shown in FIG. 6, each of the transparent plastic substrates 7a and 7b is formed by laminating gas barrier layers 12 on both surfaces of a base material layer 11 and by laminating surface layers 13 on both outer resulting surfaces of the gas barrier layers. The base material layer 11 may be formed, for example, using polycarbonate (PC), polyacrylate (PAR), polyethersulfone (PES), or the like. The gas barrier layers 12 may be formed, for example, using an organic material such as ethylene vinyl alcohol (EVA) or polyvinyl alcohol (PVA), or a inorganic material such as SiOx. Further, the surface layers 13 may be formed, for example, using an epoxy resin or the like.

The gas barrier layers 12 prevent gas entering the liquid crystal 10 through the plastic substrates 7a and 7b. The surface layers 13 are provided in order to enhance surface hardnesses of the substrates 7a and 7b, improve chemical resistance and enhance adhesion of the ITO.

After a plurality of liquid crystal panels 1 are placed in the packaging box 4 as shown in FIG. 1, the packing box 4 is enclosed in a container 5 in a form of a gas impermeable bag to act as a container vessel as shown in FIG. 2. The container bag 5 may be fabricated, for example, using polyvinylidene chloride coat, PET (polyethylene terephthalate), or aluminum-metallized PET. Thereafter, the container bag 5 is placed in a depressurizing chamber 14 as shown in FIG. 3 and, then, the depressurizing chamber 14 is evacuated using an exhauster 16.

After the depressurizing chamber 14 is evacuated to a depressurized condition almost equaling a vacuum thereby removing most of the air surrounding the packaging box 4, $N_2$ gas is fed into the container bag 5 from a nitrogen gas source 17. When $N_2$ gas infiltrates the container bag 5 so as to substitute for the air previously surrounding the packing box 4, pressing heads 18a and 18b which are heated to a high temperature are moved towards each other as shown by arrows "x" and "y" in FIG. 3 to press opposing sides of the container bag 5 together thereby sealing the opening. By a series of steps as described above, a liquid crystal panel package 19 can be obtained as shown in FIG. 4, in which the packaging box 4 is enclosed in the container bag 5 being sealed while being filled with $N_2$ gas. A plurality of the liquid crystal panels 1 thus packaged in the packaging box 4 are stored or transported in the liquid crystal panel package 19.

In FIG. 6, the base material layer 11 and the surface layers 13 as components of the plastic substrate 7a or 7b have many minute gas permeating pores which allow permeation of undesirable gases having small molecular diameters, such as $O_2$, $CO_2$ and the like. Accordingly, when the plastic substrate 7a or 7b is fabricated with only plastic layers, $O_2$ and $CO_2$ gases present in air enter the liquid crystal by passing through the gas permeating pores. Further, even other gases having large solubility coefficients can permeate the plastic layers and enter the liquid crystal even though they have large molecular diameters, such as $CO_2$.

In contrast, when gas barrier layers 12 are provided, such gas permeation can be prevented to some degree. Even if such gas barrier layers 12 are provided, however, $O_2$ and $CO_2$ in the air can still gradually enter the liquid crystal 10 by passing through the plastic substrate 7a or 7b while the liquid crystal panels 11 are being conventionally stored, particularly for long time periods while surrounded with air. As a result, the gases dissolved in the liquid crystal material can form bubbles in the liquid crystal material 10.

Meanwhile, when the surroundings of the liquid crystal panels 11 are set in a $N_2$ gas atmosphere with $O_2$ and $CO_2$ substantially removed from such regions like in the above-described liquid crystal panel package 19 shown in FIG. 4, the amount of gas permeating the plastic substrate 7a or 7b can be markedly reduced since $N_2$ gas has a sufficiently large molecular diameter relative to the gas permeating pores in the base material layer 11 and the other layers described above. Additionally, $N_2$ gas has a very small solubility coefficient. As a result, bubble generation in the liquid crystal material can be reliably prevented.

Incidentally, it is preferable to place a desiccating agent such as silica gel in the container bag 5. More preferably, the agent to be placed in the container bag should be a substance which can absorb gases such as oxygen at the same time as absorbing moisture. Such an agent is RP™ agent manufactured by Mitsubishi Gas Chemical Co., Inc. By such agent, dehumidifying or moisture-proofing can also be achieved.

In a second embodiment of the present invention, a plurality of liquid crystal panels 1 are placed in the packaging box 4 in the manner as shown in FIG. 1, the packaging box 4 is then placed into the container bag 5 as shown in FIG. 2, the container bag 5 is placed in the depressurizing chamber 14 as shown in FIG. 3 and the depressurizing chamber 14 is evacuated using the exhauster 16. Further, after the depressurizing chamber 14 is evacuated to a predetermined depressurized condition almost equaling a vacuum, the container bag 5 is sealed by pressing heads 18a and 18b together while maintaining the depressurized condition without replacing the evacuated air with $N_2$ gas.

By the above-described process, the surroundings of the packing box 4, namely, the surroundings of the liquid crystal panels 1 can be set in a vacuum or depressurized condition, and the liquid crystal panels 1 can be stored and/or transported in such a vacuum condition. By setting the surroundings of the liquid crystal panels 1 to a vacuum or depressurized condition, the entrance of gas into the crystals through the plastic substrates 7a or 7b of the liquid crystal panels 1 can be prevented. Accordingly, bubble generation in the liquid crystal material can also be prevented. Incidentally, in a case where the surroundings of the packaging box 4 are set to a depressurized condition as in the second embodiment, the packaging box 4 can be deformed or crushed by ambient pressure. Accordingly, for such a case, it is preferable to use a packaging box having high strength.

In the liquid crystal panel package 19 shown in FIG. 4, a plurality of the liquid crystal panels 1 are packaged in the packaging box 4 and the air surrounding the packaging box 4 is replaced with $N_2$ gas. Instead of such an embodiment, a plurality of liquid crystal panels 1 may be directly placed in a container bag 5 without the use of a packaging box 4 and the surrounding air may be replaced with $N_2$ gas. Alternatively, instead of placing a plurality of liquid crystal panels 1 in the container bag 5, the liquid crystal panels may be individually placed in container bags 5 and the surrounding air be replaced with $N_2$ gas.

Additionally, although a case of packaging liquid crystal panels 1 alone is exemplified in the embodiment shown in FIG. 1, the liquid crystal panels 1 may be equipped with auxiliary parts such as a liquid crystal driving IC, a back light and other components to form liquid crystal displays, and the liquid crystal displays may be packaged instead of the above embodiment.

Further, the container vessel to hermetically surround the liquid crystal panels is not limited to the container bag 5 made of polyvinylidene chloride coat, PET, or aluminum-metallized PET. The container bag might be fabricated from another material. Or, any vessel having a shape other than a bag can also be used. Moreover, as to the gas that substitutes for the air surrounding the liquid crystal panels, any gas can be used so long as it has the properties of a large molecular diameter and/or a low solubility coefficient. For example, Xe, Kr, and the like can be regarded as such gases.

Table 1 shows molecular diameters of principal gases. Table 2 shows solubility coefficients of principal gases. As is shown in Table 1, molecular diameters of $N_2$, Xe, and Kr are relatively large. Additionally, as is shown in Table 2, the solubility coefficient of $N_2$ is relatively small. Also, the solubility coefficients of Xe and Kr are relatively large but are not shown in Table 2. From these facts, $N_2$, Xe and Kr can be understood to be suitable as desirable gases for surrounding liquid crystal panels. Meanwhile, although the molecular diameter of $CO_2$ is large and similar to $N_2$ as shown in Table 1, the solubility coefficient of $CO_2$ is markedly larger as shown in Table 2. Therefore, $CO_2$ is unsuitable as a gas for surrounding the liquid crystal panels.

A liquid crystal panel package according to the present invention can be obtained by practicing the above-described packaging method. Specifically, liquid crystal panel package comprises a pair of plastic substrates and a liquid crystal material encapsulated therebetween. The liquid crystal panel package has a container for hermetically surrounding the liquid crystal panel and undesirable gases such as $O_2$ and $CO_2$ are removed from the container. Also, in the liquid crystal panel package, the liquid crystal panel may be individually packaged or it may be packaged in the form of a liquid crystal display equipped with the liquid crystal panel and auxiliary components such as a back light and other components. Additionally, the liquid crystal panel may be individually hermetically surrounded or a plurality of liquid crystal panels may be contained in one packaging box and the box would be hermetically surrounded.

TABLE 1

Molecular Diameters of Gas Molecules

| Gas Molecule | Molecular Diameter (Å) |
|---|---|
| Xe | 4.0 |
| Kr | 3.7 |
| $N_2$, $CO_2$ | 3.2 |
| $NH_3$, CO | 3.1 |
| Hg | 3.0 |
| Ar, $O_2$ | 2.9 |
| He | 2.7 |
| $H_2$ | 2.3 |

TABLE 2

Solubility Coefficients of Gases Relative to Polymer Membranes

| Polymer Membrane | Temp. (°C.) | Solubility Coefficient ($\times 10^3$) | | | |
|---|---|---|---|---|---|
| | | He | $CO_2$ | $O_2$ | $N_2$ |
| Poly(Dimethyl Siloxane) | 20 | 0.36 | 5.93 | 1.86 | 1.47 |
| Natural Rubber | 25 | 0.14 | 11.8 | 1.47 | 0.72 |
| Low Density Polyethylene | 25 | 0.073 | 3.39 | 0.62 | 0.30 |
| Polyvinyl Chloride | 25 | 0.073 | 6.27 | 0.384 | 0.312 |

According to the method of the present invention for packaging liquid crystal panels, since undesirable gases such as $O_2$ and $CO_2$ are removed from the hermetic spaces surrounding the liquid crystal panels, such gases are reliably prevented from entering the liquid crystals through the plastic substrates of the liquid crystal panels. As a result, bubble generation in the liquid crystal material can be prevented.

According to the method of the present invention for packaging liquid crystal panels, undesirable gases such as $O_2$ and $CO_2$ can be removed from around the liquid crystal panels by a simple process. Further, overload impression onto the liquid crystal panels or the packing boxes containing liquid crystal panels can be prevented in comparison to the method in which $O_2$ and other gases are removed by depressurizing the surroundings of the liquid crystal panels. Using the method in which $O_2$ and other gases are removed from the container bag, overload impression is obtained onto the liquid crystal panel or the packing box containing the liquid crystal panel. Because air pressure in the container bag is so low compared to air pressure outside of the container bag, the container bag tightly adheres to the liquid crystal panel or the packing box containing the liquid crystal panel. In comparison, the method in which $N_2$ or other gases are replaced, overload impression does not occur to the liquid crystal panel or the packing box. Because air pressure in the container bag and outside of container bag are substantially equal, the container bag does not adhere to the liquid crystal panel or the packing box.

According to the method of the present invention for packaging liquid crystal panels, the cost can be saved if no substitute gas is required after removing the undesirable gases such as $O_2$ and CO2.

The present invention is illustrated with reference to preferred embodiments as described above. The present invention is, however, not limited to such embodiments, and can be modified within the technical scope recited in claims.

What is claimed is:

1. A method for packaging a liquid crystal panel device having a pair of plastic substrates and a liquid crystal material encapsulated therebetween, the method comprising the steps of:

enveloping the liquid crystal panel device with a container substantially impermeable to gases and containing an undesirable gas;

removing the undesirable gas from the container; and hermetically sealing the liquid crystal panel device in the container after removing the undesirable gas from the container.

2. A method according to claim 1, further comprising the step of supplying a desirable gas into the container before the step of hermetically sealing the container and after the step of removing the undesirable gas from the container.

3. A method according to claim 2, wherein the desirable gas is one of nitrogen, xenon and krypton.

4. A method according to claim 2, wherein the desirable gas includes a plurality of gas molecules with each gas molecule having a molecular diameter sufficiently large so that a single gas molecule is inhibited from migrating through a selected one of a plurality of gas-permeating pores formed in the plastic substrates.

5. A method according to claim 2, wherein the desirable gas has a solubility coefficient less than oxygen.

6. A method according to claim 2, wherein the desirable gas includes a plurality of gas molecules with each gas molecule having a solubility coefficient less than oxygen and a molecular diameter sufficiently large so that a single gas molecule is inhibited from migrating through a selected one of a plurality of gas-permeating pores formed in the plastic substrates.

7. A method according to claim 1, wherein the step of removing the undesirable gas from the container creates one of a vacuum condition in which a container pressure measured inside the container after the step of hermetically sealing the container is zero and a depressurization condition in which the container pressure is lower than an ambient pressure measured externally of the container.

8. A liquid crystal panel package, comprising:

at least one liquid crystal panel device with each liquid crystal panel device including a pair of plastic substrates and a liquid crystal material encapsulated therebetween;

a packaging box sized to receive the at least one liquid crystal panel device and fabricated from a gas permeable material; and a container fabricated from a gas impermeable material and containing an undesirable gas, the container sized to contain the packaging box with the liquid crystal panel device received therein so that, after the undesirable gas is removed from the container, the container contains the packaging box and the liquid crystal panel device substantially free of the undesirable gas in a hermetically sealed state.

9. A liquid crystal panel package according to claim 8, wherein the liquid crystal panel device is one of a liquid crystal panel and a liquid crystal display.

10. A liquid crystal panel package according to claim 8, after the undesirable gas is removed from the container and the container contains the packaging box and the liquid crystal panel device in the hermetically sealed state, the container is in one of a vacuum condition in which a container pressure measured inside the container when hermetically sealed is zero and a depressurization condition in which the container pressure is lower than an ambient pressure measured externally of the container.

11. A liquid crystal panel package according to claim 10, wherein when the container is in the depressurization condition, the container contains a desirable gas.

12. A liquid crystal panel package according to claim 11, wherein the desirable gas is one of nitrogen, xenon and krypton.

13. A liquid crystal panel package according to claim 11, wherein the desirable gas includes a plurality of gas molecules with each gas molecule having a molecular diameter sufficiently large so that a single gas molecule is unable to migrate through a selected one of a plurality of gas-permeating pores formed in the plastic substrates of the liquid crystal panel device.

14. A liquid crystal panel package according to claim 11, wherein the desirable gas has a solubility coefficient less than oxygen.

15. A liquid crystal panel package according to claim 11, wherein the desirable gas includes a plurality of gas molecules with each gas molecule having a solubility coefficient less than oxygen and a molecular diameter sufficiently large so that a single gas molecule is unable to migrate through a selected one of a plurality of gas-permeating pores formed in the plastic substrates of the liquid crystal panel device.

16. A liquid crystal panel package according to claim 8, further comprising a pallet housing having at least one cavity formed therein and sized to receive the at least one liquid crystal panel device, said pallet sized to be received by the packaging box.

* * * * *